United States Patent
Quinn et al.

(10) Patent No.: US 6,879,317 B2
(45) Date of Patent: Apr. 12, 2005

(54) COLLAPSIBLE DATA ENTRY PANEL

(75) Inventors: Brian P. Quinn, 8840 106th Ave., Pleasant Prairie, WI (US) 53158; Gregory C. Borucki, Hinsdale, IL (US); Marino Cecchi, Lake Geneva, WI (US)

(73) Assignee: Brian P. Quinn, Pleasant Prairie, WI (US)

( * ) Notice: Subject to any disclaimer, the term of this patent is extended or adjusted under 35 U.S.C. 154(b) by 272 days.

(21) Appl. No.: 09/853,201

(22) Filed: May 11, 2001

(65) Prior Publication Data

US 2002/0167495 A1 Nov. 14, 2002

(51) Int. Cl.$^7$ ................................................. G09G 5/00
(52) U.S. Cl. ....................... 345/168; 345/169; 345/170; 345/172; 400/472; 400/473; 400/491; 248/166; 248/167; 248/434; 361/680; 135/143; 84/179
(58) Field of Search ................................. 345/168, 169, 345/172, 170, 156; 400/472, 473, 491; 248/166, 167, 434; 361/680; 135/143; 341/22; 84/179

(56) References Cited

U.S. PATENT DOCUMENTS

| | | |
|---|---|---|
| 4,090,045 A | 5/1978 | Marsh |
| 4,261,042 A | 4/1981 | Ishiwatari et al. |
| 4,314,114 A | 2/1982 | Larson |
| 4,517,421 A | 5/1985 | Margolin |
| 4,602,135 A | 7/1986 | Phalen |
| 4,795,888 A | 1/1989 | MacFarlane |
| 4,939,514 A | 7/1990 | Miyazaki |
| 4,994,634 A | 2/1991 | Tanji et al. |
| 4,996,522 A | 2/1991 | Sunano |
| 5,044,798 A | 9/1991 | Roylance et al. |
| 5,132,496 A * | 7/1992 | Lee .............................. 200/5 A |
| 5,141,343 A | 8/1992 | Roylance et al. |

(Continued)

OTHER PUBLICATIONS

PC World News, Portable Key pads, Jun. 1999.
LandWare, GoType! Keyboard, Mar. 2000.
PiloKey Review, PiloKey Review Palm Pilot Information, Mar. 7, 2000.
Electronic Paper Mar. 13, 2000.
Winning at the Inventing Game Apr. 13, 2000.
Handspring Newsletter, Two New Keyboards, May 27, 2000.

*Primary Examiner*—Xiao Wu
*Assistant Examiner*—Abbas Abdulselam
(74) *Attorney, Agent, or Firm*—Greer, Burns & Crain, Ltd.

(57) ABSTRACT

A collapsible data entry panel comprises, an upper layer of flexible sheet material having formed keys on its outer surface and conductive areas or contacts on its inner surface, a lower layer of flexible sheet material having conductive circuits or traces on its inner surface, and resilient, flexible frame around the peripheral margins of the sheet material layers that pulls the layers taut so that they are parallel to and spaced apart from one another. Depression of a formed key will cause a corresponding, underlying contact to connect with the conductive trace carried by the lower layer, and thereby complete a circuit representative of the depressed key. The data entry panel of the invention is collapsible to a surface area less than ½ of its extended configuration by twisting the respective ends of the panel in opposite directions, while applying a slight inward pressure. In its collapsed configuration, the panel can readily fit into a shirt pocket or purse. If the panel is subsequently released, it will automatically spring back to its original, extended configuration.

12 Claims, 5 Drawing Sheets

U.S. PATENT DOCUMENTS

| | | | |
|---|---|---|---|
| 5,193,925 A | 3/1993 | Foulke | |
| 5,198,991 A | 3/1993 | Pollitt | |
| 5,212,473 A | 5/1993 | Louis | |
| 5,220,521 A | 6/1993 | Kikinis | |
| 5,227,615 A | 7/1993 | Oogita | |
| 5,267,127 A | 11/1993 | Pollitt | |
| 5,305,181 A | 4/1994 | Schultz | |
| 5,457,453 A | 10/1995 | Chiu et al. | |
| 5,459,461 A | 10/1995 | Crowley et al. | |
| 5,490,037 A | 2/1996 | Clancy | |
| 5,519,569 A | 5/1996 | Sellers | |
| 5,532,904 A | 7/1996 | Sellers | |
| 5,543,787 A | 8/1996 | Karidis et al. | |
| 5,574,481 A | 11/1996 | Lee | |
| 5,575,576 A | 11/1996 | Roysden, Jr. | |
| 5,615,393 A | 3/1997 | Kikinis et al. | |
| 5,616,897 A | 4/1997 | Wever et al. | |
| 5,621,610 A | 4/1997 | Moore et al. | |
| 5,625,354 A | 4/1997 | Lerman | |
| 5,666,112 A | 9/1997 | Crowley et al. | |
| 5,675,361 A | 10/1997 | Santilli | |
| 5,680,126 A | 10/1997 | Kikinis | |
| 5,684,279 A * | 11/1997 | Burgett | 200/5 A |
| 5,733,056 A | 3/1998 | Meagher | |
| 5,879,088 A * | 3/1999 | English | 400/481 |
| 5,973,282 A | 10/1999 | Takemori et al. | |
| 6,137,676 A * | 10/2000 | Merkel | 361/680 |
| 6,173,934 B1 * | 1/2001 | Lin | 248/284.1 |
| 6,310,606 B1 * | 10/2001 | Armstrong | 345/161 |
| 6,331,850 B1 * | 12/2001 | Olodort et al. | 345/168 |
| 6,384,810 B1 * | 5/2002 | Selker | 345/168 |
| 6,449,147 B2 * | 9/2002 | Zheng | 361/683 |
| 6,507,336 B1 * | 1/2003 | Lunsford | 345/168 |
| 6,575,647 B1 * | 6/2003 | Daniel | 400/472 |

* cited by examiner

COLLAPSIBLE DATA ENTRY PANEL

FIELD OF THE INVENTION

The present invention relates to keyboards and other data entry panels for inputting information into a computer, and more specifically to collapsible keyboards.

BACKGROUND OF THE INVENTION

The miniaturization, expanding processing power and communications capabilities of computer and electronic equipment continues to accelerate at a furious pace. One of the primary factors driving this growth relates to what is commonly referred to as Moore's Law, after Gordon Moore, the co-founder of Intel Corporation. Moore's Law, while actually only a theory, states that the density of transistors doubles every 18 to 24 months. This miniaturization, coupled with declining cost of computer chips, continues to drive development of a broad and deep matrix of new electronic devices in addition to new combinations of existing devices. Hardware is being enhanced by software that permits communication, Internet, and World Wide Web (Web) access. In the future, many consumer products are expected to have the capability of being connected, monitored and controlled over electronic networks. wireless telephones; electronic/computer systems for automobiles, trucks and other vehicles; musical synthesizers and other related products; televisions; digital video disks (DVDs); video cassette recorders (VCRs); calculators; kiosks; and other present and evolving electronic products. Hardware devices are being reduced in size and weight, enhanced in processing power and communication capabilities, and combined with complementary products as the underlying technologies advance. In addition, new technological features are being incorporated into appliances and other products that traditionally lacked such characteristics.

User interfaces for these creative new products are also evolving. Output devices, consisting primarily of print, video and audio devices, have become smaller with sharper images and acoustics. Video monitors can now be built into standard prescription eyeglasses or manufactured to display color web pages on screens smaller than a dime. In general, displays are significantly thinner, lighter, and consume less power than in the recent past. Similarly, computer printers and scanners are now available which fit into a coat pocket at much lower cost.

Input devices consist primarily of keyboards, scanners, cameras, microphones and other sensors. All of these input devices have enjoyed improved performance coupled with efficient miniaturization, with the notable exception keyboards and related keyboard-input devices. For the purpose of this application, the definition of input devices is those devices that allow information to be manually input into electronic devices.

The most familiar, comfortable, efficient and accepted interfaces for people who manually input information are full-sized keyboards and keypads, such as standard computer keyboards; pianos (and other musical instruments); telephones; and calculator key panels. However, despite continuing advances in technology, these full-sized input devices have not kept pace with the shrinking size and weight of electronic hardware. Full-sized input devices are too heavy and impractical to use and transport, particularly for the increasing number of devices intended to fit into a shirt pocket or purse.

The main obstacle which limits even greater growth and market acceptance of many new electronic products, particularly portable devices, has been a lack of full-sized keyboard-based input solutions which can satisfy two important requirements: first, providing conventional utilization in terms of a full-size layout, standard key spacing and proper tactile response; and second, having the ability to be easily compressed and miniaturized for transport and storage. These two characteristics will become increasing important to the communication and information technology industries as new products evolve and further penetrate the mass market.

The primary approach the electronic industry has taken to address problems with keyboard-based input devices has been to start from a standard hard keyboard and significantly reduce its overall dimensions while maintaining its proportions. Such keyboards are almost always an attached component of the product and do not offer an acceptable user experience in terms of key spacing and tactile response. While these smaller keyboards provide portability to the products, users are frustrated to sacrifice traditional usability and efficiency. Many have invested substantial amounts of time and money to master keyboard skills. The success of any electronics product will be limited if unfriendly or unfamiliar input devices handicap users.

Efforts have been made to develop collapsible keyboards, but have met limited success. For example, U.S. Pat. Nos. 5,616,897 to Weber et al. and 5,666,112 to Crowley et al. disclose a roll-up keyboards. U.S. Pat. No. 5,574,481 to Lee discloses a folding keyboard. U.S. Pat. Nos. 5,141,343 to Roylance, 5,575,576 to Roysden, and 5,733,056 to Meagher disclose contracting-expanding keyboards. However, few of these prior art efforts have succeeded in collapsing a keyboard to a sufficiently small size, i.e., pocket size. In addition, many of these keyboards are mechanically complex and as a result costly to manufacture. One example of a mechanically complex collapsible keyboard that folds to fit in a pocket is the Stowaway™ keyboard by a company called ThinkOutside.

Another response to the problems with keyboard-based input devices is to rely on handwriting recognition software for data entry. This answer admits defeat for keyboard-oriented users and those with poor penmanship. There are few handwriting recognition programs that can achieve 100% accuracy. Furthermore, the fastest handwriting recognition programs currently take about three times as long to recognize characters compared to typing on a keyboard.

Voice recognition software is also being offered as an alternative to keyboard-based input, but this solution has its limitations including a need for faster processing, a current lack of broad-based acceptance and serious privacy issues. While some may be comfortable dictating to computers in the privacy of their home or office, few are able or willing to do so in public.

Finally, many portable electronic devices avoid the input dilemma altogether by only interfacing with other electronic devices (primarily personal computers). While this strategy further enhances the size and portability of these products, it eliminates the increasingly important need to input information and communicate in the field. To date, the information technology industry has been stifled by a lack of acceptable input devices that provide both full size usability and compact portability. As a result, the growth rates and acceptance of many new products, particularly portable electronic devices, have been significantly constrained. Until now, consumers who input information have been forced to sacrifice either size or usability.

OBJECTS OF THE INVENTION

It is an object of the invention to provide a substantially full size data entry panel with normal key spacing. It is a further object of the invention to make the data entry panel collapsible to a small, compact size. It is another object of the invention that the panel has an acceptable tactile response. It is a final object of the invention that the panel be economically manufactured.

SUMMARY OF THE INVENTION

The foregoing objects of the invention are satisfied by a collapsible data entry panel of the invention. The panel in its most basic form comprises, an upper layer of flexible sheet material having formed keys on its outer surface and conductive areas or contacts on its inner surface, a lower layer of flexible sheet material having conductive circuits or traces on its inner surface, and a resilient, flexible frame around the peripheral margins of the sheet material layers that pulls the layers taut so that they are parallel to and spaced apart from one another. Depression of a formed key will cause a corresponding, underlying contact to connect with the conductive trace carried by the lower layer, and thereby complete a circuit representative of the depressed key.

The data entry panel of the invention is collapsible to a surface area less than ½ and as small as ⅓ of its extended configuration. Specifically, by twisting the respective ends of the panel in opposite directions, while applying a slight inward pressure, the frame flips, twists and collapses upon itself. The collapsed panel typically comprises three coiled, lobes, thus having a surface area of about ⅓ the original size. In its collapsed configuration, the panel can readily fit into a shirt pocket or purse. If the panel is subsequently released, it will automatically spring back to its original, extended configuration.

The lower layer comprises a flexible, lightweight fabric with independent patterns of circuits (conductive traces) printed in conductive ink on the top or inner surface. Each circuit includes a pair of contact points for each "key." The printed conductive traces, other than the contact points, may be coated with an insulating material(s) to provide protection from wear and tear. The top layer is also formed from a lightweight flexible fabric, but alternatively could comprise a thin, molded polymer material. Preferably, the keys are formed by printing a thick polymer material onto the outer surface of the top layer so as to form a three dimensional key surface that may be felt by the user. Alternatively, the top layer could be molded or embossed to form cup-shaped keys. The inner surface of the top layer contains conductive areas or contacts that correspond to the contact points on the lower layer. Preferably, the top and bottom layers are insulated from each other by the airspace created by the frame when the fabric is pulled taut.

Alternatively or in addition, an intermediate layer of fabric is inserted between the top and bottom layers, particularly when the independent patterns of circuits (conductive traces) are separated and printed on the opposing top and bottom layers. The intermediate layer has a pattern of holes that correspond to the contact points. Thereby the intermediate layer allows the contact points to meet (when a "key" is depressed) but otherwise insulates the top and bottom traces from any unintended short circuits.

The frame is preferably a hoop of spring steel. In its opened or extended configuration, the frame pulls the two layers taut, creating an airspace between layers to insulate the upper and lower conductive traces.

The present invention is a creative and unique solution to previously insurmountable problems in the art. Input devices based on this design offer standard functionality when opened, and compact easy portability when closed. Depending on the materials used, the weight of the data entry panel can be a fraction of comparable full sized devices. They can also be designed to closely match user preferences, both functional and ornamental, and to interface with a wide variety of electronic equipment.

The data entry panel of the invention has applicability as a full-sized computer keyboard or can be use for other input devices, such as musical keyboards, numerical keypads, and specialized keyboards. The panel is slim, flexible and lightweight. It provides conventional utilization in terms of a full-size layout, standard key spacing and proper tactile response, while also having the ability to be compressed to a compact size. When the panel is not in use it is reduced to about one-third its size by twisting and collapsing the frame and structure onto itself and forming (three) joined sections. In this manner, the panel is reduced to approximately the size of a thin doughnut and stored comfortably on a belt or in a shirt pocket or purse. This flexibility allows the data entry panel of the invention to be employed as a stand alone peripheral, or to be integrated with other components, such as microprocessors and displays, to become a self-contained handheld device. For example, the surface areas that form the three lobes when the unit is collapsed (the areas that substantially do not fold or bend) could house additional microprocessors, displays, power supplies, etc. By adding flexible displays and circuits throughout the unit a stand-alone computer, wireless telephone, or other device can be created.

These and other objects and advantages of the invention will become apparent from the following detailed description as considered in conjunction with the accompanying drawings.

DETAILED DESCRIPTION OF THE PREFERRED EMBODIMENTS

Figure 2:
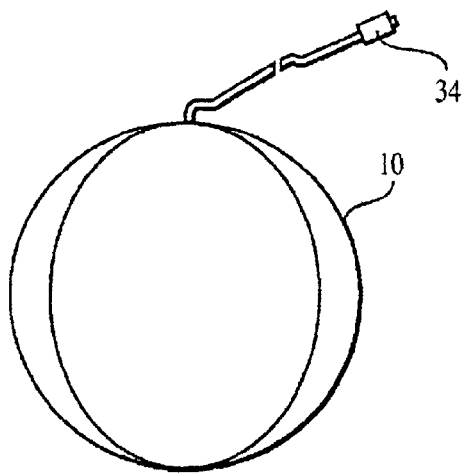
FIG. 2 is a plan view of the collapsible data entry panel of the invention in a collapsed, compact configuration.
Figure 3:
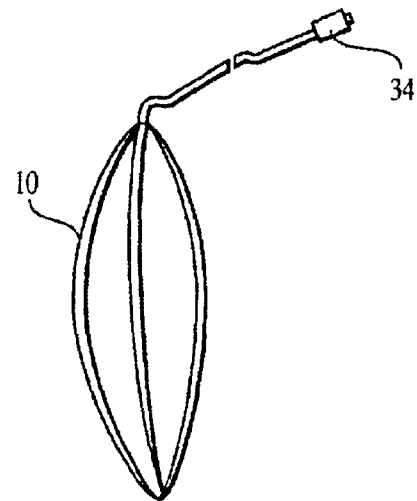
FIG. 3 is a side elevational view of the data entry panel of the invention in the collapsed, compact configuration.
Figure 4:
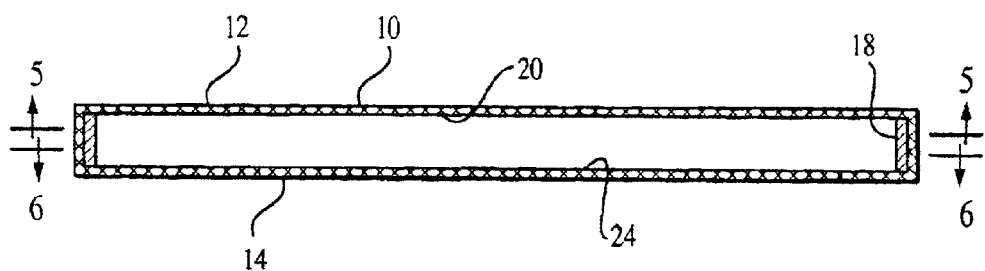
FIG. 4 is a cross-sectional view of the data entry panel of the invention taken along line 4—4 of FIG. 1.

Turning now to the drawings, a collapsible data entry panel 10 of the invention is shown. The term "data entry panel" covers all types of input devices, including keyboards, key panels, pointing devices and other tactile input devices for computers, telephones, palm pilots, electronic games, and other electronic devices. The panel 10 comprises an upper layer of flexible sheet material 12, a lower layer of flexible sheet material 14, and a flexible frame 18 for holding the layers of sheet material in a substantially taut, spaced apart relationship. The data entry panel 10 of the invention is collapsible to a surface area less than ½ and as small as ⅓ of the extended panel, as shown in FIGS. 2 and 3. Specifically, by twisting the respective ends of the panel 10 in opposite directions, while applying a slight inward pressure, the frame 18 flips, twists and collapses onto itself. The collapsed panel typically comprises three coiled lobes, thus having a surface area of about ⅓ the original size. In its collapsed configuration, the panel can easily fit into a shirt pocket. If the panel 10 is subsequently released, it will automatically spring back to its original, extended shape.

Figure 5:
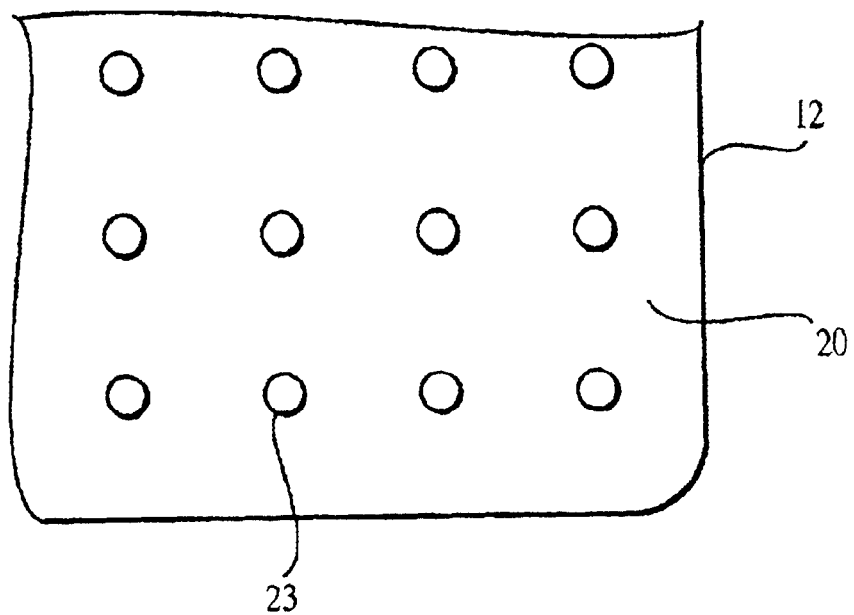
FIG. 5 is a plan view of the inside surface of a portion of the upper layer of flexible material.
Figure 6:
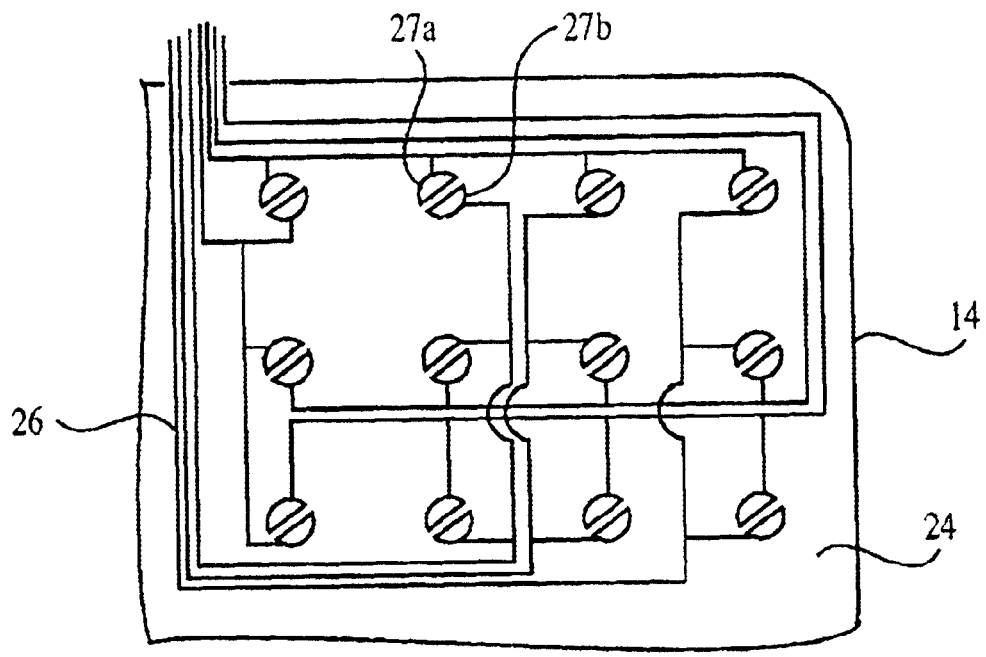
FIG. 6 is a plan view of the inside surface of a portion of the lower layer of flexible material corresponding to the portion of the upper layers illustrated in FIG. 5.

A plurality of electric circuits and switches are provided for the operation of the individual keys of the data entry panel of the invention. The circuits are at least partly held in between the upper and lower layers 12,14. More specifically, the electric circuits comprise conductive traces 26 printed on an inner surface of one or both of the layers 12,14. In the most preferred embodiment, conductive traces 26 are printed on the inner surface 24 lower layer 14. FIGS. 5 and 6 illustrate conceptually upper and lower traces, respectively, of the preferred embodiment. FIGS. 5 and 6 merely illustrate the basic concept that depression of a key completes a circuit unique to that key, which is then decoded for digital transmission. The traces or electronic circuits 26 are electrically connected to a multiple conductor cable 32. Cable 32 terminates in a plug 34.

Figure 9:
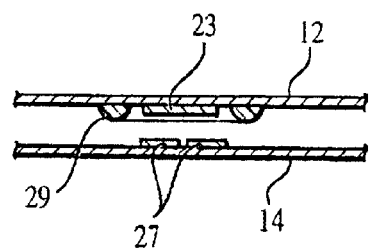
FIG. 9 is a detailed cross-section of a switching means.
Figure 10:
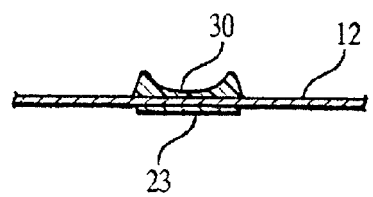
FIG. 10 is a detailed cross-section of a key.

A plurality of switching means are formed between the layers 12,14 for operation of individual keys. The switching means comprise pair of contacts, each pair being electrically connected to a respective electrical circuit. Depressing the upper layer 12 at a select location causes a pair of contacts at that location to meet, completing a circuit. The switching means may be formed in a variety of ways. In the most preferred embodiment, each circuit trace printed on the lower layer 14 includes a pair of closely spaced contact points 27a,27b. An inner surface 20 of the upper layer carries conductive contact or switch member 23. Contact 23 is preferably a metal disk to provide good contact and improved tactile feel; however, other conductive means could be used such as a spot of conductive ink. Each upper layer contact 23, corresponds to a pair of points 27a,27b, as shown in FIGS. 5, 6 and 9. The outer surface of upper layer of sheet material 12 has keys 30 or other indicia, which correspond to the contacts 23 and 27. When a user of the data entry panel of the invention depresses a key 30 the upper layer 12 depends downwardly causing contact 23 to meet and bridge the pair of contacts 27. This completes a circuit that is unique to the depressed key.

Optionally, one may provide a spacer 29 around one or both of the contacts. Spacer 29 is preferably formed of a soft electrometric material. The spacer functions to hold the upper and lower contacts is a spaced relationship. Because the material is soft, it is readily compressed by a finger (key stroke) to cause the contacts 23,27 to meet and complete the circuit for that key. The size and softness of the spacer 29 may be adjusted to provide a desired tactile feel to the data entry panel of the invention. Spacer 29 although desirable for some applications is not an essential element of the invention. Spacing between contacts is preferably provided by the cooperative relation between the frame and flexible sheet, that holds upper and lower layers taut and spaced apart one from the other. Further, the spacers 29 may provide added bulk that interferes with the collapsibility of the panel.

Decoding circuitry (not shown) converts the specific completed circuit into a signal representing the key that had been depressed for input to a microcomputer or other electronic device. Keyboard decoding circuitry is well known in the art. The decoding circuitry may advantageously be housed within plug 34, may be stitched into or otherwise held in panel 10, or may be a held in a separate housing.

The upper 12 and lower 14 fabric layers maybe fabricated from any flexible sheet material. Nylon fabric woven for dimensional stability has been found to work particularly well for the bottom layer that preferably carries the circuits or trace patterns. The sheet material is desirably lightweight, strong and flexible. The upper layer 12 is preferably a lightweight, four-way stretch material, such as Lycra®. The fabric may be made in any color or color pattern, which opens many marketing opportunities for creative design. There may be instances where the lower layer is not flexible, for example a keyboard mounted on a wall or other hard surface. Alternatively, a desktop version may be provided where the upper layer of the keyboard is made of a flexible sheet material, but the lower layer is built into a finished piece of wood, stone, or other hard material.

Figure 11:
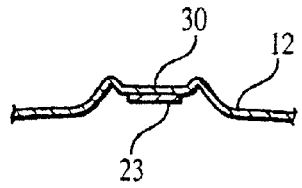
FIG. 11 is a detailed cross-section of an alternative key.

The upper surface of upper layer 12 is printed with indicia representing desired keyboard keys. Each such key indicia is printed over the corresponding switch. Preferably, the key itself is formed by printing the upper surface of the upper layer with a polymeric material to form a raised, cup-shaped area for receiving the finger tip of a user, each such area corresponding to the keys 30 or other indicia. Alternatively, keys may be formed by embossing or molding the upper layer 12, as shown in FIG. 11.

The electric circuits 26 and contacts 23 and 27 may be formed of any suitably conductive material. Conductive ink screen printed to the aforementioned nylon fabric is preferred. Acceptable conductive ink is CMI 114-31, available from Creative Materials, Tyngsboro, Mass. The ink or other conductive material must be able to withstand repeated fatigue without forming cracks or other defects that could to lead to failure of the circuit.

Optionally, foam or other materials may be inserted between layers 12 and 14 to improve the feel or tactile response of the panel. However, these are generally not preferred as they add bulk to the panel, makes it more difficult to collapse, and increases the size of the panel in its collapsed configuration.

Figure 7:
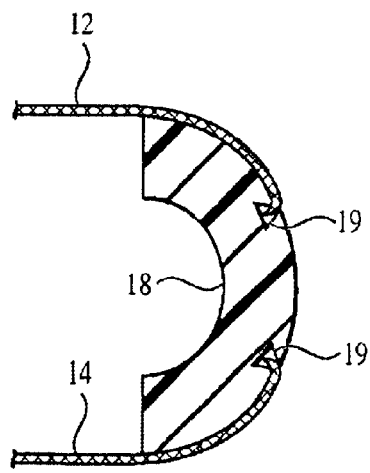
FIG. 7 is a cross-section of an alternative frame member.
Figure 8:
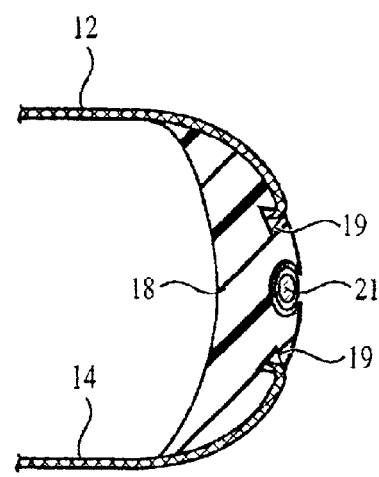
FIG. 8 is a cross-section of a second alternative frame member having a electronic cable.

Frame 18 is preferably fabricated from spring steel. Alternatively, the frame may be made from other materials, such as plastic, as shown in FIGS. 7 and 8. Alternatively, the frame may be formed of composite materials, e.g., fiberglass, or a composite steel and extruded polypropylene structure. Regardless of material chosen, the frame should have spring-like characteristics. Thereby, the frame is adapted to twist and collapse into three (or more) lobes, and on release, to spring back to its original shape. The frame functions to hold layers 12 and 14 taut and juxtaposed relative to one another. The height of the frame is preferably about 3–5 mm. This will result in spacing apart the layers 12 and 14 by 3 mm or more. The spacing is important, particularly to create the proper tactile response. It is too small, false contacts between traces 22 and 26 could result. If the spacing is too large, it may be cumbersome to make desired contacts. A frame height may be adjusted as desired to provide a comfortable keystroke.

It is contemplated that means other than a spring-like flexible frame could be employed for stretching or otherwise holding layers 12 and 14 taut and juxtaposed relative to one another. For example, a rigid frame could be used to mount the layers of sheet material on an automobile steering wheel. A flexible, albeit not collapsible, frame of polymer material could be used to incorporate the panel of the invention into clothing.

The peripheral margins of the flexible layers may be attached to the frame in any manner. The upper and lower layers may be sewn together with the frame loosely held between layers. Flexible layers can also be attached either by using adhesives or sonic welding. Alternatively, the frame may include fasteners, such as grooves 19, for holding the edges of the sheet material. The frame may further include, if desired, a channel or other passageway for holding a cable 21.

The data entry panel of the invention may desirably include a pointing device, such as a touch panel, mouse, or pointing stick, for moving a cursor on a display. A touch panel 36 is shown. The pointing device is electrically connected to a microprocessor having a display. Finger movement on the panel is transmitted to underlying circuitry which senses the direction of finger movement and transmits the same to the microprocessor's screen driver circuitry which repositions the cursor on the screen, as is known in the art. As the panel 10 of the invention collapses into essentially three lobes, it is possible to incorporate a thin, relatively inflexible component, such as a touch panel, in one of the lobes. The touch panel may be mounted in any conventional manner, for example by sewing the panel to the upper layer 12.

Figure 1:
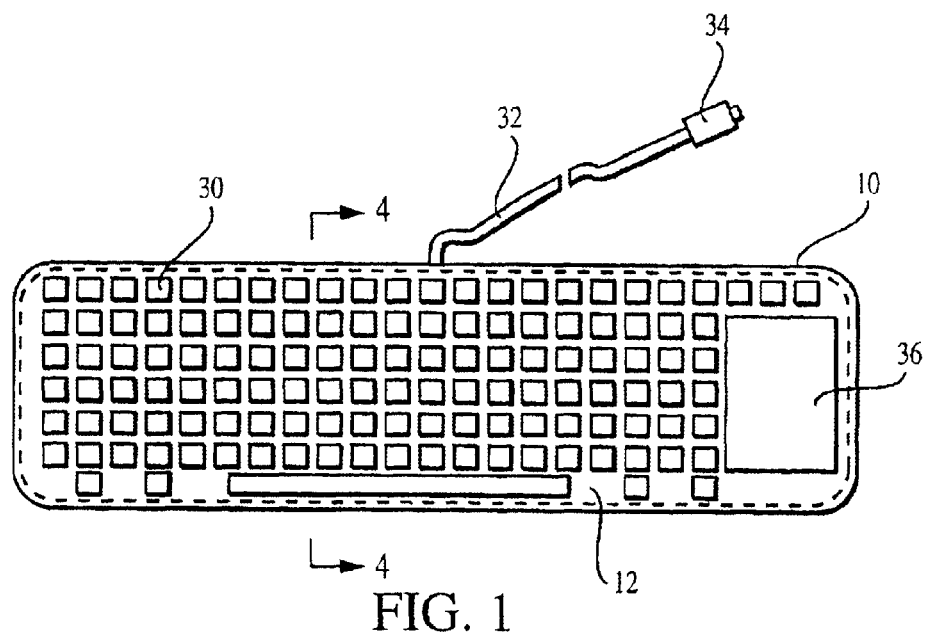
FIG. 1 is a plan view of the collapsible data entry panel of the invention in an extended, panel configuration.
Figure 12:
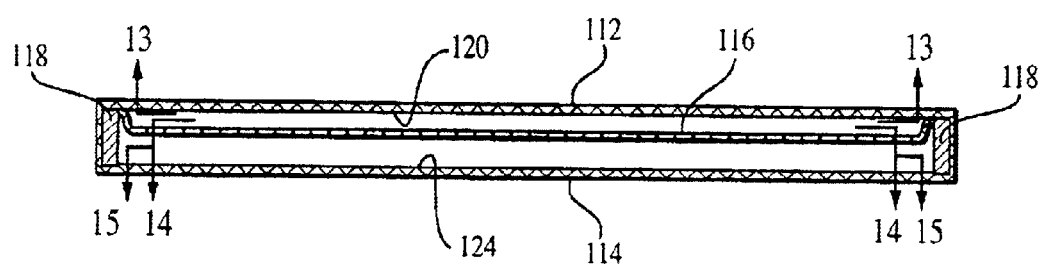
FIG. 12 is a cross-section of a second embodiment of the invention.

The data entry panel of the invention may be used for a variety of functions. A computer keyboard is shown in FIG. 1. A music keyboard, e.g., piano, is shown in FIG. 9. A key pad for a personal communication device is shown in FIG. 11. A pocket calculator is shown if FIG. 12. Other applications for the invention will be apparent to those skilled in the art.

Figure 13:
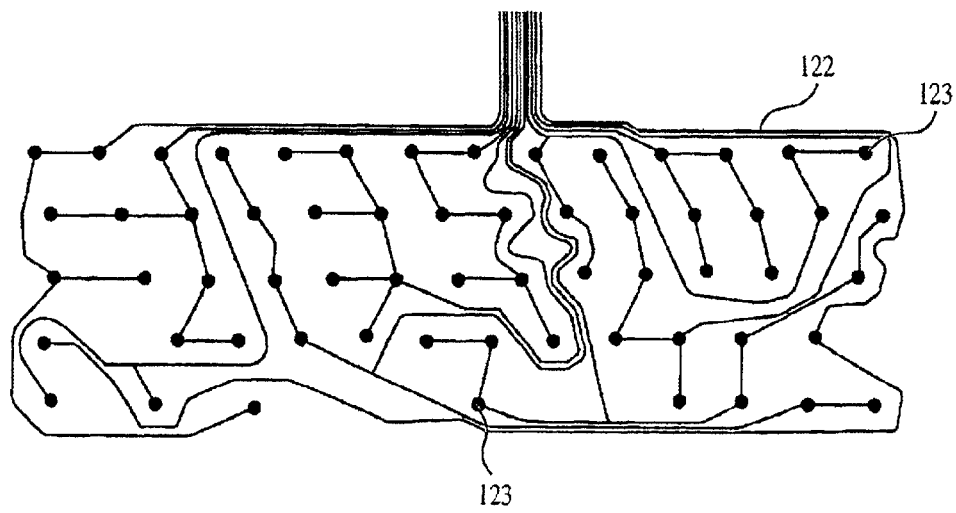
FIG. 13 is an inside plan view of an upper layer of flexible material of the invention taken along line 13—13 of FIG. 12.
Figure 14:
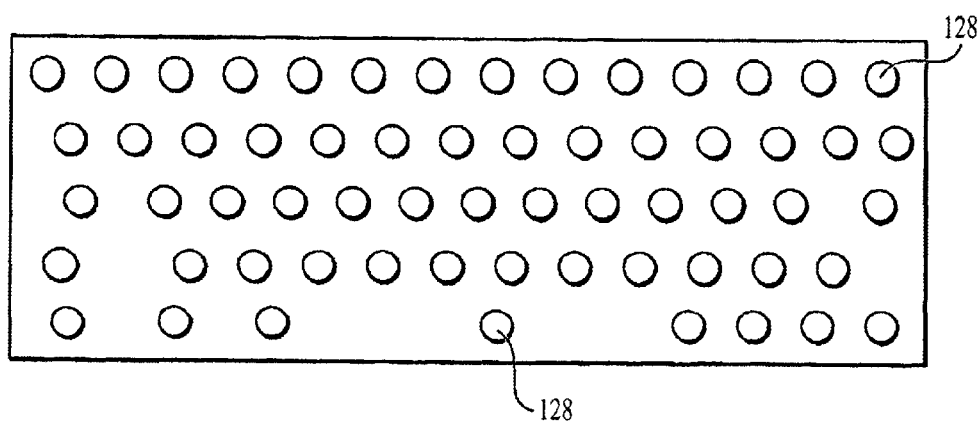
FIG. 14 is a plan view of an intermediate layer of flexible material of the invention taken along line 14—14 of FIG. 12.
Figure 15:
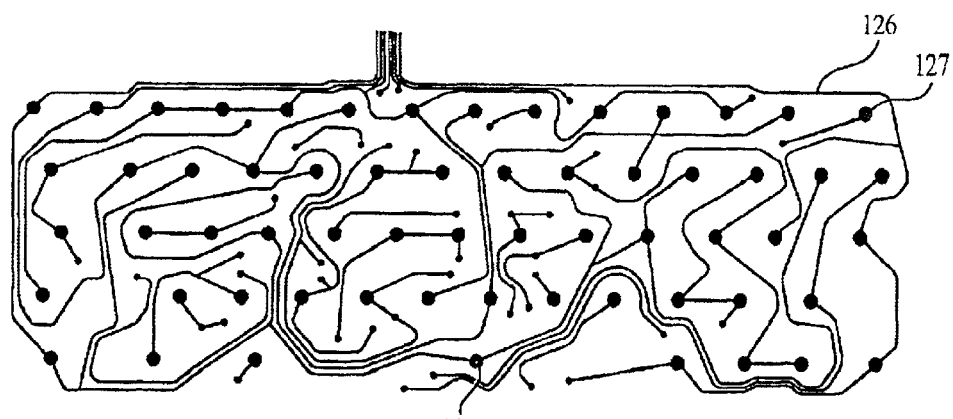
FIG. 15 is an inside plan view of a lower layer of flexible material of the invention taken along line 15—15 of FIG. 12.

A second embodiment of the invention is shown in FIGS. 12–15. In the second embodiment, the reference numerals generally correspond to the first embodiment, but in the 100 series. A collapsible data entry panel 110 comprises an upper flexible layer of flexible sheet material 112, a lower layer of flexible sheet material 114, and intermediate layer of flexible sheet material 116, and a flexible frame 118 for holding the layers of sheet material in a substantially taut relationship. An inner surface 120 of the upper layer carries a conductive trace 122 and a plurality of contacts 123, as shown in FIG. 13. The inner surface 124 of the lower layer carries a conductive trace 126 with corresponding contacts 127, as shown in FIG. 15. The intermediate layer 116 has a pattern of holes 28 that correspond respectively to the contacts in the upper and lower traces. The upper layer of sheet material 112 has keys 130 or other indicia on its outer surface, which likewise correspond to the contacts 123 and 127. The traces 122 and 126 are electrically connected to a multiple conductor cable 132. Cable 132 terminates in a plug 134. When a user of the data entry panel of the invention depresses a key the upper layer 112 depends downwardly causing the upper 123 and lower 127 contacts to contact one another through the respective hole 128. This completes a circuit that is unique to the depressed key. As in the first embodiment, decoding circuitry (not shown) converts the specific completed circuit into a signal representing the key that had been depressed for input to a microcomputer or other electronic device.

Figure 16:
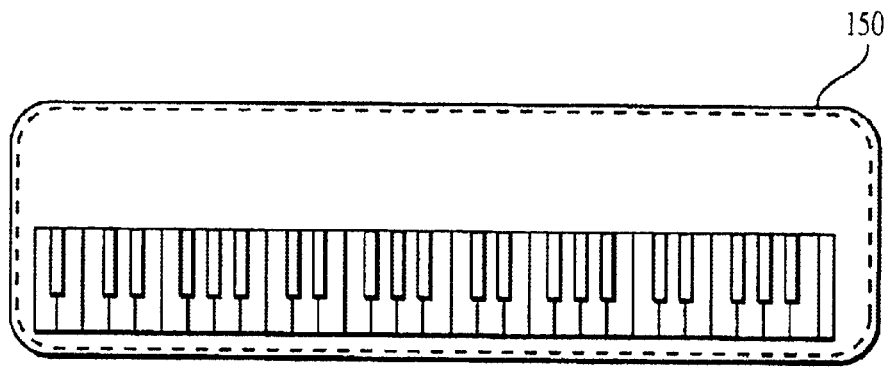
FIG. 16 is a plan view of a third embodiment if the invention, illustrating a music keyboard.
Figure 17:
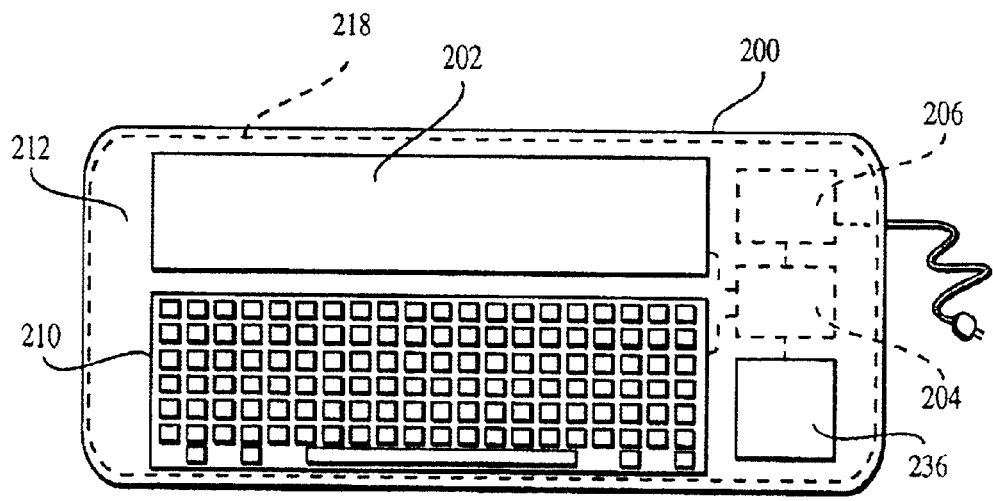
FIG. 17 is a plan view of a fourth embodiment of the invention, illustrating an integrated microcomputer
Figure 18:
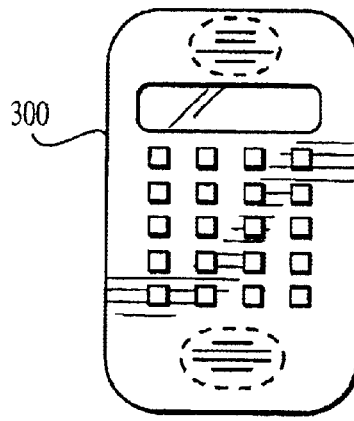
FIG. 18 is a plan view of a fifth embodiment of the invention, illustrating a personal communication device.
Figure 19:
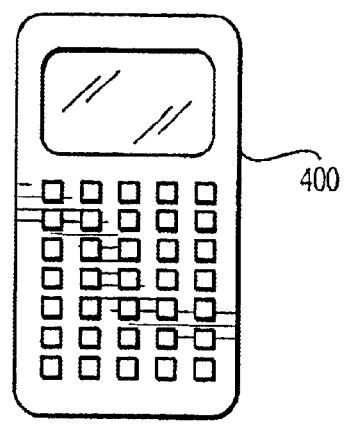
FIG. 19 is plan view of a sixth embodiment of the invention, illustrating a programmable calculator.

It is contemplated that various component parts may be incorporated into the panel of the invention. FIG. 16 illustrates collapsible microcomputer 200, comprising a keyboard 210, a pointing device 236, a display 202, microprocessor 204 and power supply 206. The keyboard element 210 is constructed as described above in reference to either the first or second embodiments. The microprocessor 204 and power supply 206 could be made in a sufficient small size to fit within one of the lobes of the panel 200, such that panel could be collapsed without damage to the processor or power supply.

The display 202 is preferably flexible so that it may be collapsed with the panel 200. For example, display 202 may be constructed by "electronic paper" techniques, currently under development by several companies such as E-ink Corporation, Cambridge, Mass. Cambridge Display Technologies is one company that is developing a computer display that utilizes electronic paper technology. Electronic paper technology is based on ink comprised of microcapsules that may be applied to surfaces, such as upper layer 212 of flexible sheet material. Each microcapsule contains colored chips that when appropriately energized form letters or other images. Whether utilizing electronic paper technology or other emerging technologies, such as organic light emitting diodes, it is intended that the display 202 should be flexible so that the panel 200 including display 202 may be collapsed as described above.

The several embodiments of the invention may be manufactured economically. Indeed the cost of the spring frame, fabric and conductive traces may be sufficiently small that the panel could be sold as a disposable keyboard.

The objects and advantages of the invention have therefore been shown to be attained in a convenient, practical, economic and facile manner. Although several preferred embodiments of the invention have been shown and described, it will be apparent to those skilled in the art that modifications and alternative embodiments of the invention may be made. The above description of the preferred embodiments is intended to be illustrative of the invention as defined by the appended claims, and is not intended to limit the scope the scope of the invention or to preclude coverage of obvious modifications or equivalent embodiments.

What is claimed is:

1. A collapsible panel for an electronic device having an extended configuration and a collapsed configuration comprising
    an upper layer of flexible sheet material;
    a lower layer of flexible sheet material;
    at least one electrical circuit on at least one of said upper and lower layers of sheet material; and
    a flexible frame at the peripheral margins of said upper layer of sheet material for holding at least said upper layer of sheet material taut and spaced apart from said lower layer of sheet material, said flexible frame being substantially planar in the extended configuration and in the collapsed configuration being a plurality of coiled lobes having less than ½ the surface area as in the extended configuration.

2. A collapsible panel as in claim 1, further comprising at least one switch means between said upper and lower layers of sheet material whereby depression of said upper layer to said lower layer at said switch means will complete said electrical circuit.

3. A collapsible panel as in claim 2, wherein said electrical circuit is on an inner surface of one of said layers of sheet material, and said switch means comprises a pair of contact points connected to said circuit and a conductive switch member on the inner surface of the other of said layers of sheet material, said switch member being juxtaposed relative to said pair of contact points, whereby depression of said upper layer to said lower layer at said switch member will cause said switch member to engage the corresponding said pair of contact points to complete said circuit.

4. A collapsible panel as in claim 1 wherein said electrical circuit comprises traces of conductive material on the inner surface of at least one of said layers of sheet material.

5. A collapsible panel as in claim 1, further comprising a polymeric material adhered to said upper layer of sheet material adjacent said switch means to form a finger tip receptive key.

6. A collapsible panel as in claim 1, further comprising a pointing device mounted to said panel.

7. A collapsible keyboard having an extended configuration and a collapsed configuration comprising
an upper layer of fabric having a plurality of indicia on its outer surface representing keys, and having a plurality of upper contacts, each said upper contacts corresponding to a respective one of said indicia;
a lower layer of fabric having a plurality of contact points corresponding to the contacts of said upper layer;
a plurality of electrical circuits connected to one or both of said upper contacts and said lower contact points, each circuit representing a respective one of said keys; and
a resilient, flexible frame between said upper and lower fabric layers on at least a portion of the peripheral margins of said layers, said frame holding said upper and lower fabric layers taut, parallel to and spaced apart from one another, and said frame being collapsible into a comparatively smaller disk.

8. An input apparatus for an electronic device comprising
an upper layer of flexible sheet material;
a lower layer of material;
a frame means on at least a portion of the peripheral margins of said upper layer of sheet material for holding said upper layer of sheet material taut and spaced apart from said lower layer of material;
at least one electrical circuit comprised of traces of conductive material on an inner surface of at least one of said layers of material; and
at least one switch means between said upper and lower layers of material and connected to said electrical circuit for completing said circuit when said upper layer is depressed to contact said lower layer.

9. An apparatus as in claim 8, wherein said frame means comprises a flexible spring hoop.

10. A collapsible panel for an electronic device having an extended configuration and a collapsed configuration, comprising:
at least one layer of flexible sheet material, said layer including means for data input or output;
a flexible frame connected to said layer of flexible sheet material for holding said layer taut;
said panel being substantially planar in the extended configuration; and
said data entry panel being a plurality of coiled lobes in the collapsed configuration, the surface area of said panel in the collapsed configuration being less than ½ the surface area in the extended configuration.

11. A collapsible panel as in claim 10, wherein said means for data input or output comprises at least one of a tactile input device and a video display.

12. A method of collapsing an electronic device, comprising:
providing a substantially planar electronic device comprised of flexible sheet material and a flexible frame;
applying inward force to the respective ends of said device;
twisting the respective ends in opposite directions while applying said inward force; and
collapsing said device into a plurality of coiled lobes that have less than ½ the planar surface area of said device prior to being collapsed.

* * * * *